US009625255B2

(12) United States Patent
Pettersson et al.

(10) Patent No.: US 9,625,255 B2
(45) Date of Patent: Apr. 18, 2017

(54) METHOD FOR MEASURING AN ANGLE BETWEEN TWO SPATIALLY SEPARATED ELEMENTS

(71) Applicant: HEXAGON TECHNOLOGY CENTER GMBH, Heerbrugg (CH)

(72) Inventors: Bo Pettersson, London (GB); Frank Przygodda, Friedrichshafen (DE); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 376 days.

(21) Appl. No.: 14/372,726

(22) PCT Filed: Jan. 16, 2013

(86) PCT No.: PCT/EP2013/050761
§ 371 (c)(1),
(2) Date: Jul. 16, 2014

(87) PCT Pub. No.: WO2013/107780
PCT Pub. Date: Jul. 25, 2013

(65) Prior Publication Data
US 2015/0002840 A1    Jan. 1, 2015

(30) Foreign Application Priority Data
Jan. 17, 2012  (EP) .................................... 12151437

(51) Int. Cl.
*G01B 11/26*    (2006.01)
*G01B 9/02*    (2006.01)
(Continued)

(52) U.S. Cl.
CPC .............. *G01B 11/26* (2013.01); *G01B 9/021* (2013.01); *G01B 9/02027* (2013.01);
(Continued)

(58) Field of Classification Search
CPC ................... G03H 1/0005; G03H 1/30; G03H 2001/0033; G01C 15/02; G01B 11/26; G01B 9/021; G01B 9/02027
(Continued)

(56) References Cited

U.S. PATENT DOCUMENTS 4,227,807 A * 10/1980 Pond .......................... G01J 9/02
356/139.03
5,936,723 A * 8/1999 Schmidt ................. G01B 11/26
356/139.03
(Continued)

FOREIGN PATENT DOCUMENTS

CN    101034484 A    9/2007
CN    101813776 A    8/2010
(Continued)

OTHER PUBLICATIONS

European Search Report dated Jun. 13, 2012 as received in Application No. EP 12 15 1437.

*Primary Examiner* — Mark Hellner
(74) *Attorney, Agent, or Firm* — Maschoff Brennan

(57) ABSTRACT

Some embodiments of the invention relate to a method for measuring an angle between two spatially separated elements having the steps: preparing a multiplex hologram having a plurality of interference patterns, at least two having different angles of incidence of an object light wave onto a hologram plane; arranging the multiplex hologram in a first element plane on a first element; lighting the multiplex hologram with a reference light wave; arranging a light detector in a second element plane on a second element; detecting a reference light wave refracted on an interference pattern with a light detector; creating an intensity pattern from the detected refracted reference light wave; assigning the angle of incidence stored as machine readable data to the
(Continued)

intensity pattern; and/or calculating an angle between the first element plane and the second element plane from the assigned angle of incidence.

20 Claims, 7 Drawing Sheets

(51) Int. Cl.
  *G01B 9/021* (2006.01)
  *G03H 1/00* (2006.01)
  *G03H 1/30* (2006.01)
  *G01C 15/00* (2006.01)

(52) U.S. Cl.
  CPC ......... *G01C 15/002* (2013.01); *G03H 1/0005* (2013.01); *G03H 1/30* (2013.01); *G03H 2001/0033* (2013.01)

(58) Field of Classification Search
  USPC ...................................................... 356/152.1
  See application file for complete search history.

(56) References Cited

U.S. PATENT DOCUMENTS

| 7,839,547 B2 | 11/2010 | Miura et al. |
| 2009/0180107 A1 | 7/2009 | Daigle |
| 2010/0157307 A1 | 6/2010 | Taillade et al. |

FOREIGN PATENT DOCUMENTS

| CN | 102221328 A | 10/2011 |
| CN | 102589440 A | 7/2012 |
| DE | 3424806 A1 | 8/1985 |
| GB | 2409514 B | 6/2005 |
| JP | 57-100304 A | 6/1982 |
| JP | 61-165611 A | 7/1986 |
| JP | 06-229756 A | 8/1994 |
| JP | 2001-118254 A | 4/2001 |
| JP | 2006-228374 A | 8/2006 |
| JP | 2011-164493 A | 8/2011 |

\* cited by examiner

5 – Angle Sensor
31, 31', 31'' - Interference Pattern
40 - Beam Splitter
41, 41', 41'' - Objects 6 – Light Detector
31, 31', 31'' -  Interference Pattern
60 - Sensor
61, 61', 61'' – Intensity Patterns a) Providing Multiplex Hologram (3)

b) Arranging Multiplex Hologram (3)

c) Illuminating Multiplex Hologram (3)

d) Arranging Light Detector (6)

e) Acquiring Reference Light Wave f) Forming Intensity Pattern g) Assigning Angle of Incidence h) Calculating Angle 1, 2 – Separated Elements
3 – Multiplex Hologram
4 – Light Source
5 – Angle Sensor
6 – Light Detector
7 – Analysis Unit

METHOD FOR MEASURING AN ANGLE BETWEEN TWO SPATIALLY SEPARATED ELEMENTS

FIELD OF THE INVENTION

The invention relates to a method for measuring an angle between two spatially separated elements.

BACKGROUND

Determining angles and directions is required in many fields of application such as geodesy, building construction and civil engineering, industrial automation technology, etc. In this case, high demands are placed on the measuring precision, the measuring speed, and the degree of availability; and all of this is also under rough environmental conditions.

JP 57100304 discloses an angle measuring device, which uses a spot-shaped object light beam and, as an alternative to an optical lens which is susceptible to dirt and damage, a two-dimensional hologram. For this purpose, the hologram is inscribed in a flat plate. Accordingly, the degree of transmission is only dependent on two spatial directions. The corresponding dependence of the location in a plane of the real image of the object light beam hologram on the angle of incidence of the light beam is used. The location of the spot image changes continuously in the event of a corresponding angle of incidence change. It is acquired using a position sensor and the respective angle of incidence is inferred therefrom. DE 3424806 A1 describes a measuring unit for the contactless acquisition of a relative position between a first element and a second element, which, in contrast to JP 57100304, ascertains angles via the readout of a code. Such an element can be a component of a precision machine, and it can also be a device scale of an optical instrument.

The two elements are spatially separated from one another over a distance of 100 m, for example. The first element has a code carrier, and the second element has a code reader having a computer downstream from the code reader. The code reader acquires a one-dimensional code pattern of the code carrier and transmits a code signal to the computer for an acquired code pattern. The computer has means for quantification of the transmitted code signal and for comparison to a stored code pattern and for calculation of the relative position between the first element and the second element from the result of the comparison.

SUMMARY

Some embodiments the invention may provide for an improved method for measuring an angle between two spatially separated elements.

According to the invention, the method for measuring an angle between two spatially separated elements has the following steps: a) providing a multiplex hologram having multiple interference patterns, at least two interference patterns have different angles of incidence of an object light wave on a hologram plane, the angles of incidence are stored as data in a computer-readable manner; b) arranging the multiplex hologram in a first element plane on a first element; c) illuminating the multiplex hologram using a reference light wave; d) arranging a light detector in a second element plane on a second element; e) acquiring a reference light wave, which is diffracted on an interference pattern, using the light detector; f) forming an intensity pattern from the acquired diffracted reference light wave; g) assigning the computer-readable angle of incidence, which is stored as data, to the intensity pattern; and h) calculating an angle between the first element plane and the second element plane from the assigned angle of incidence.

In the present invention, an intensity pattern is understood as a flatly extending arrangement of a plurality of shapes, for example, squares or lines, which have a property that can be differentiated from the background on which they are placed. Such a property is the brightness value, the color value, inter alia. Such an intensity pattern is embodied, for example, as an arrangement of 500 black squares, which can partially touch, on a light rectangular surface as a background, whereby an unambiguously identifiable structure is provided. In particular, such a pattern contains an information content in the form of a machine-readable code. According to the invention, the term "code" is understood as mapping of data by means of binary symbolic elements, for example, a barcode.

Using a multiplex hologram, an angle-resolved intensity pattern may be reconstructed from a diffracted reference light wave in a way known per se. In this case, an intensity pattern can only be reconstructed with maximum intensity respectively for a discrete angle of incidence of the reference light wave in each case. It has been shown that this angle resolution may also be practically applied during the measurement of an angle between two spatially separated elements. In consideration of the information content of the intensity pattern, specifically an angle of incidence of an object light wave on the hologram plane of the multiplex hologram may be assigned very rapidly and unambiguously to the intensity pattern. As a result of the non-continuous angle distribution, a discontinuous—quasi-digital—assignment of angles of incidence and intensity patterns results. The assignment is performed in this case on the basis of the information content of a pattern. From the spatial alignment of the hologram plane with respect to a first element and also from the spatial alignment of the light detector, which acquires the diffracted reference light wave, with respect to a second element, while using existing, proven, and robust technologies of geodesy or industrial surveying technology, an angle between the first element and the second element may be calculated. A refined angle determination can be achieved according to the invention, inter alia, in that additionally the strength of the intensity of an intensity pattern is acquired, since intensities which differ from the maximum intensity may still also be acquired within a specific angle range around the respective angle of incidence. A deviation from the discrete angle of incidence is quantifiable by the comparison to the known maximum intensity. With a sufficiently large number of independent interference patterns, an arrangement of intensity patterns results, which is sufficiently dense to obtain a quasi-continuous angle resolution.

Coordinates of the second element plane are advantageously specified in a reference coordinate system; coordinates of the assigned angle of incidence are specified in the reference coordinate system; and, in step h), the angle is calculated from the difference of the coordinates of the second element plane and the coordinates of the assigned angle of incidence.

Since the multiplex hologram is arranged in a known fixed spatial relationship to the first element plane of the first element, and the light detector is also arranged in a known fixed spatial relationship to the second element plane of the second element, it is therefore sufficient to specify the coordinates of the second element plane and the coordinates of the assigned angle of incidence in one and the same reference coordinate system, in order to calculate the angle simply and unambiguously.

BRIEF DESCRIPTION OF THE DRAWINGS

Further advantages and features of the invention are apparent as examples from the following description of presently preferred embodiments in conjunction with the appended figures.

DETAILED DESCRIPTION

The multiplex hologram 3 consists of a storage material having multiple interference patterns 31, 31', 31". The storage material is illuminated using an optical interference pattern 31, 31', 31" or imprinted using a digital interference pattern 31, 31', 31", for example. Other types of the provision of a multiplex hologram 3, such as embossing interference patterns 31, 31', 31" in a storage material, etc., are also possible.

Figure 1:
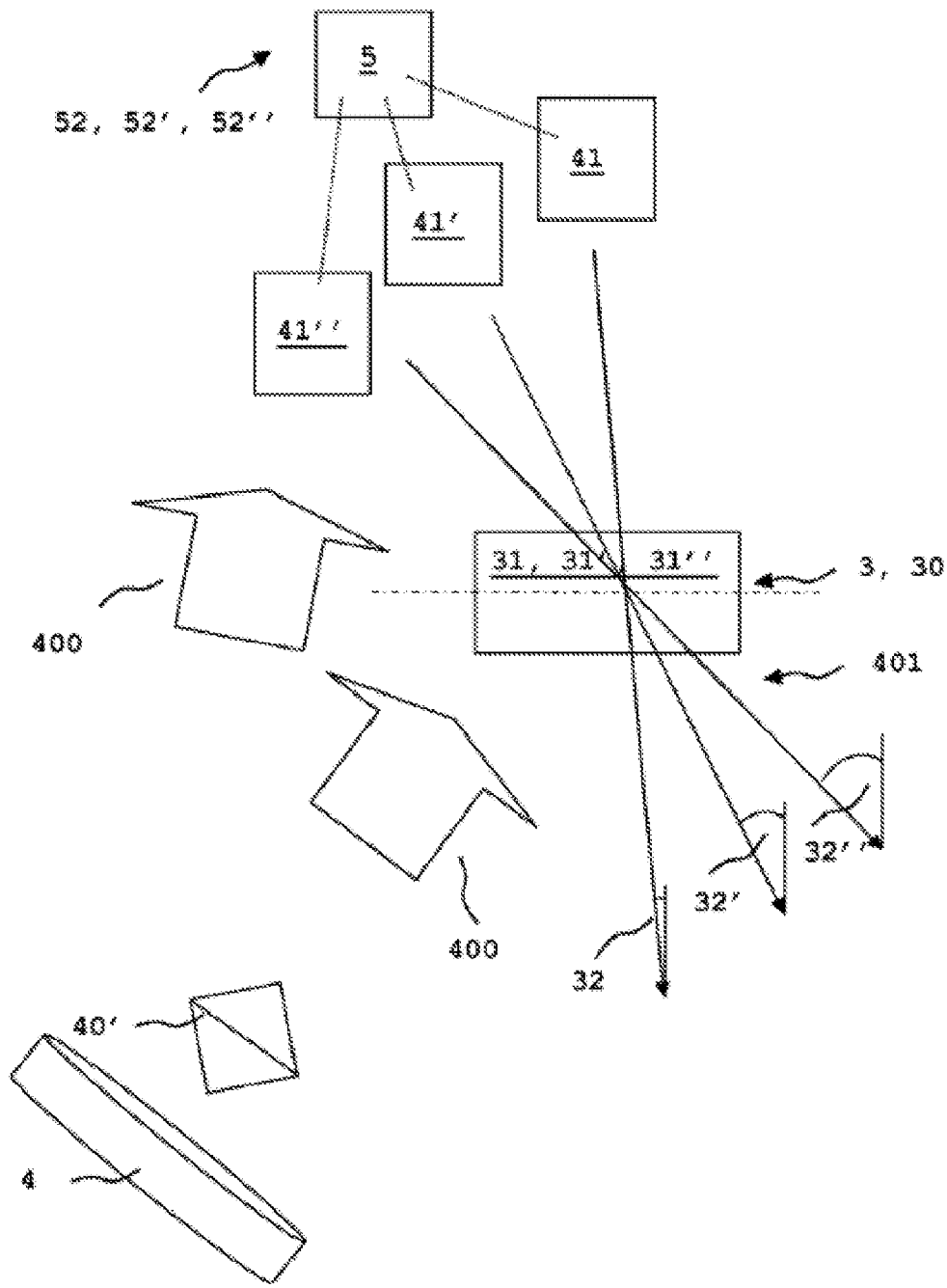
FIG. 1 shows a part of a first embodiment of a multiplex hologram having multiple interference patterns.

FIG. 1 shows the illumination of the storage material using an optical interference pattern 31, 31', 31". A coherent light source such as a helium-neon laser, an argon laser, a neodymium laser diode, an arc lamp or halogen lamp, etc., having a reference light wave 400 in the visible or infrared spectral range is used for this purpose. The light source 4 generates a reference light wave 400, which is split via a beam splitter 40. A part of the reference light wave 400 is deflected on objects 41, 41', 41" to be recorded, a part of the reference light wave 400 is deflected on a hologram plane 30 of the multiplex hologram 3. The reference light wave 400 is reflected by the objects 41, 41', 41" and is incident at an angle of incidence 32, 32', 32" as an object light wave 401 on the hologram plane 30. The angle of incidence 32, 32', 32" is the angle between the object light wave 401 and the normal of the hologram plane 30. The overlap of reference light wave 400 and object light wave 401 generates a plurality of interference patterns 31, 31', 31" in the storage material as a function of the angles of incidence 32, 32', 32" of the object light wave 401 reflected on the objects 41, 41', 41".

The number of the interference patterns 31, 31', 31" of the hologram plane 30 is restricted by the Bragg's equation. Each object 41, 41', 41" is recorded at a unique angle of incidence 32, 32', 32". In the understanding of the present invention, the term "unique" is used to mean that all angles of incidence 32, 32', 32" differ from one another. According to the Bragg's equation, the angle resolution increases with the thickness of the storage material. Therefore, so-called volume holograms are preferred, in which a thickness of the storage material is greater than the wavelength of the light source 4. Several tens of interference patterns 31, 31', 31", preferably several hundred interference patterns 31, 31', 31", preferably several thousand interference patterns 31, 31', 31" may be superimposed and individually read out in a volume unit of the multiplex hologram 3.

In prints of digital interference patterns (not shown in the figures), digital interference patterns 31, 31', 31" are synthetically provided in a computer and written into the holographic storage material by a method similar to printing. Digital interference patterns 31, 31', 31" therefore do not require any physically real objects. Such multiplex holograms are cost-effective, the production costs are approximately 0.5 per square centimeter. With regard to function, digital interference patterns 31, 31', 31" and optical interference patterns 31, 31', 31" are equivalent.

The interference patterns 31, 31', 31" specify an angle of incidence 32, 32', 32" having at least one angle coordinate, such as an azimuth angle coordinate $\theta$ or a polar angle coordinate $\phi$. The interference patterns 31, 31', 31" may be provided using one wavelength or using multiple wavelengths of the light source 4. Thus, for example, interference patterns having a first wavelength can specify the azimuth angle coordinate $\theta$ of an angle of incidence and interference patterns having a second wavelength, which is different from the first wavelength, can specify the polar angle coordinate $\phi$ of this angle of incidence.

For a storage material of one to several millimeters thickness, the angle resolution of the multiplex hologram 3 according to Bragg's equation is in the range of 0.1 mrad to 1.0 mrad, preferably at 0.3 mrad. The angle circumference of the multiplex hologram 3 is 0.1 rad to $\pi$ rad. At an angle resolution of 0.3 mrad and with use of 3333 similar interference patterns 31, 31', 31", for example, the angle circumference is therefore 1 rad.

At least one multiplex hologram 3 is arranged on the element 1. If the present invention is known, of course, multiple multiplex holograms 3 may also be arranged on the first element 1, each of which covers another angle range. For example, a first multiplex hologram 3 covers an angle range from 0 to 1 rad, a second multiplex hologram 3 covers an angle range from to 2 rad, a third multiplex hologram 3 covers an angle range from 2 to 3 rad, etc.

For the provision of such an angle-resolved multiplex hologram 3, a corresponding angle of incidence 32, 32', 32" is acquired by an angle sensor 5 from each object 41, 41', 41". In a first variant of the method, an angle signal 52, 52', 52" is formed, which comprises a pairing of the object 41, 41', 41" and its angle of incidence 32, 32', 32". The angle signal 52, 52', 52" can also comprise further items of information such as the height and width of the bell curve of the Bragg intensity I of intensity patterns 61, 61', 61", etc. The angle signal 52, 52', 52" is stored as data in a computer-readable manner. In a second variant of the method, an information content of the object 41, 41', 41" specifies the angle of incidence 32, 32', 32".

Figure 2:
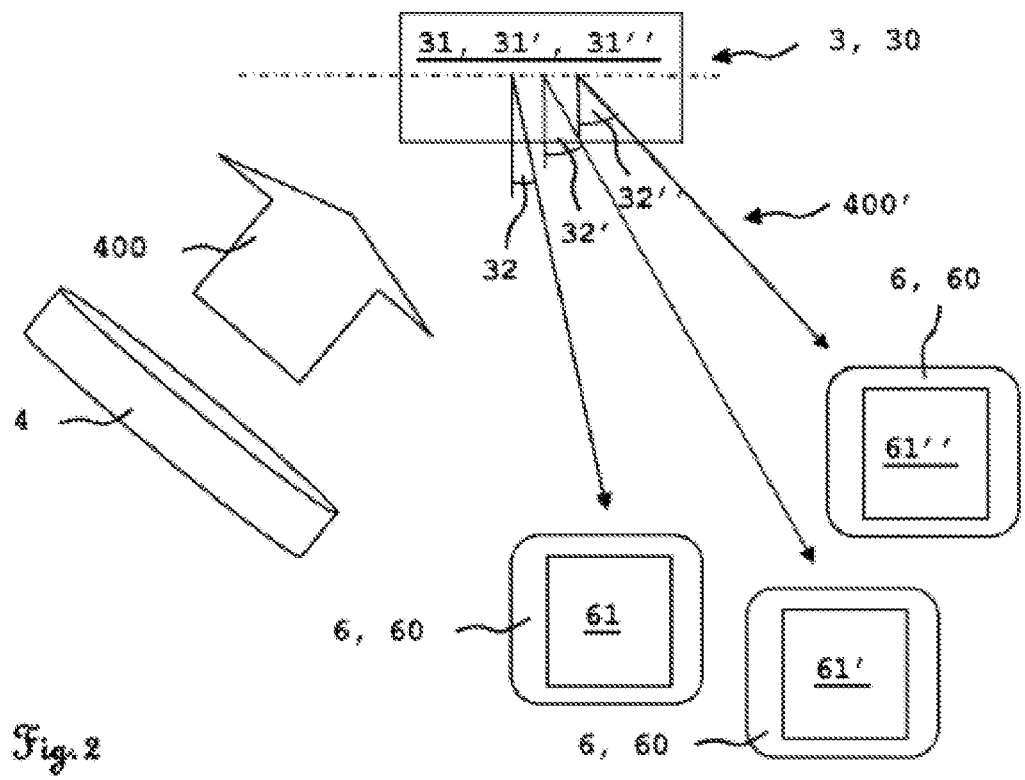
FIG. 2 shows a part of the embodiment of a multiplex hologram according to FIG. 1 during the acquisition of an intensity pattern.

FIG. 2 shows the reconstruction of an intensity pattern 61, 61', 61". For this purpose, a multiplex hologram 3 is illuminated using reference light wave 400 and a reference light wave 400', which is diffracted by the interference pattern 31, 31', 31", is acquired by a light detector 6 as intensity patterns 61, 61', 61". The reconstruction of the intensity pattern 61, 61', 61" is performed as a function of the angle of incidence 32, 32', 32", i.e., the light detector 6 must be arranged at the angle of incidence 32, 32', 32" of an interference pattern 31, 31', 31" to the multiplex hologram 3 to acquire an intensity pattern 61, 61', 61".

The light source 4 can be operated continuously or in pulses. During pulsed operation, a pulse width modulation can be performed to transmit at least one item of auxiliary information. The light source 4 transmits, with the illumination of the multiplex hologram 3 using reference light wave 400, an item of auxiliary information such as the type of the multiplex hologram 3, the version of the interference patterns 31, 31', 31", an angle signal 52, 52', 52", an ambient temperature, etc. to the light detector 6, which makes the method still more unambiguous and robust. The light source 4 advantageously has a broad band of wavelengths of light waves, of which the multiplex hologram 3 diffracts at least one wavelength of a reference light wave 400 with high efficiency. In the case of volume holograms, white light can be used.

The light detector 6 has at least one sensor 60, 60' such as a charge-coupled device (CCD) sensor or a complementary metal oxide semiconductor (CMOS) sensor. The light detector 6 acquires the intensity pattern 61, 61', 61" in a detector plane. The light detector 6 acquires at least the wavelength of the diffracted reference light source 400' and forms the intensity pattern 61, 61', 61". The light detector 6 can have filters to form the intensity pattern 61, 61', 61" in a unique manner upon the use of multiple wavelengths of the light source 4. The light detector 6 acquires the diffracted reference light wave 400' as a result of the angle resolution of the multiplex hologram 3, which is predefined by Bragg's equation, at differing Bragg intensity I over a small angle range of the angle of incidence 32, 32', 32". I.e., the light detector 6 can measure the acquired Bragg intensity I within an angle range, for example, by adding up the acquired photons per pixel of the sensor 60. The Bragg intensity I has approximately the shape of a bell curve, the acquired Bragg intensity I of the diffracted reference light wave 400' is maximal in the center of the angle range.

FIGS. 3 to 6 show four exemplary embodiments of intensity patterns 61, 61', 61", which are substantially identical to the objects 41, 41', 41" on which they are based. These are optoelectronically readable barcodes known per se in this case.

Figure 3:
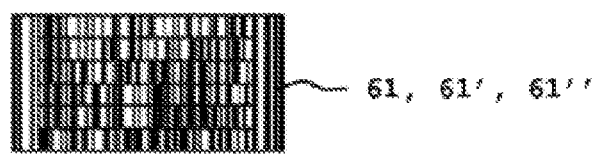
FIG. 3 shows a part of a first embodiment of an intensity pattern of a multiplex hologram according to FIGS. 1 and 2.

FIG. 3 shows an intensity pattern 61, 61', 61" in the embodiment of a two-dimensional Codablock F code having multiple lines of one-dimensional barcodes. The Codablock F code is standardized according to the standard ISO/IEC 15417 of the International Organization for Standardization (ISO) and can have 2 to 44 lines. Up to 1 kB may be coded per Codablock F code.

Figure 4:
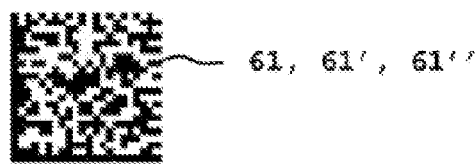
FIG. 4 shows a part of a second embodiment of an intensity pattern of a multiplex hologram according to FIGS. 1 and 2.

FIG. 4 shows an intensity pattern 61, 61', 61" in the embodiment of a two-dimensional DataMatrix code having a square or rectangular surface as a pattern of square or round symbolic elements. The DataMatrix code is standardized according to the standard ISO/IEC 16022. More than 1 kB may be coded per DataMatrix code.

Figure 5:
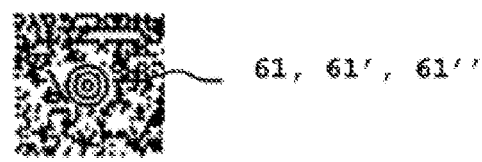
FIG. 5 shows a part of a third embodiment of an intensity pattern of a multiplex hologram according to FIGS. 1 and 2.

FIG. 5 shows an intensity pattern 61, 61', 61" in the embodiment of a two-dimensional MaxiCode having hexagonal symbolic elements and a central search pattern in the form of three concentric circles. The search pattern is well visible and allows unambiguous centering of the light detector 6 and a correction of distortions in the acquired intensity pattern. The MaxiCode has a small information content of approximately 50 bytes. The MaxiCode may be read very rapidly and reliably due to the search pattern, however.

Figure 6:
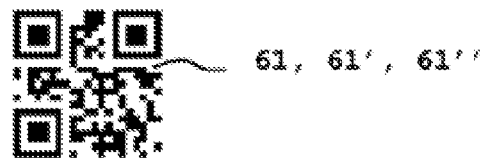
FIG. 6 shows a part of a fourth embodiment of an intensity pattern of a multiplex hologram according to FIGS. 1 and 2.

FIG. 6 shows an intensity pattern 61, 61', 61" in the embodiment of a two-dimensional QuickResponse code having a square matrix having square symbolic elements. The QuickResponse code is standardized according to the standard ISO/IEC 18004:2006. It has synchronization markings in the corners of the matrix, which allow an unambiguous orientation of the intensity pattern, so that the beginning and end of the QuickResponse code can be established unambiguously. The information content of the QuickResponse code is very high and is almost 3 kB.

If the present invention is known, other intensity patterns (not shown) may be used. Thus, not only intensity patterns having black and white symbolic elements may be used, but rather also symbolic elements having eight, sixteen, and more different gray scales may be used, which further increases the information content of the intensity patterns. A person skilled in the art can also use intensity patterns having symbolic elements of different sizes, so that larger symbolic elements of an intensity pattern can be acquired unambiguously from a greater distance of several hundred meters, while smaller symbolic elements of the intensity pattern can be acquired unambiguously from a lesser distance of less than 50 m.

Figure 7:
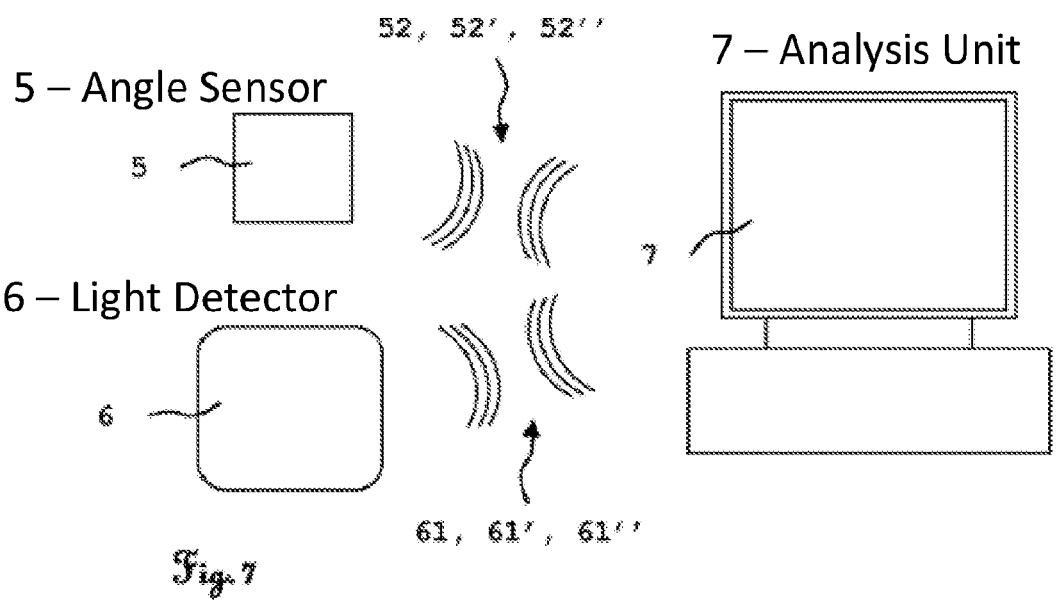
FIG. 7 shows an angle sensor according to FIG. 1 and/or a light detector according to FIG. 2 in data communication with a part of an embodiment of an analysis unit.

FIG. 7 shows a data communication between an angle sensor 5 having an analysis unit 7 and/or between a light detector 6 and an analysis unit 7. In a first variant of the method, the angle sensor 5 transmits angle signals 52, 52', 52" to the analysis unit 7, and the light detector 6 transmits intensity patterns 61, 61', 61" to the analysis unit 7. For example, the angle signals 52, 52', 52" are transmitted once at the beginning of the method to the analysis unit 7. In a second variant of the method, only the light detector 6 transmits intensity patterns 61, 61', 61" to the analysis unit 7. For example, the instantaneous intensity patterns 61, 61', 61" acquired in real time are transmitted to the analysis unit 7.

The data communication is bidirectional and can be performed in a wire-based or radio-based manner. In the case of wire-based or radio-based data communication, a protocol such as the Transmission Control Protocol/Internet Protocol (TCP/IP) is used. Wire-based data communication occurs via a data bus such as Ethernet, USB, etc. Radio-based data communication occurs via a radio network such as Enhanced Data Rate for GSM Evolution (EDGE), Asymmetric Digital Subscriber Line (ADSL), Institute of Electrical and Electronics Engineers (IEEE) 802.11, etc. The angle sensor 5, the light detector 6, and also the analysis unit 7 all have corresponding interfaces for the data communication. If the present invention is known, a person skilled in the art can also embody the light detector having analysis unit integrated in the housing as a single unit.

The analysis unit 7 has a microprocessor and a computer-readable data memory. The computer program means is loaded from the computer-readable data memory of the analysis unit 7 into the microprocessor of the analysis unit 7 and executed. The analysis unit 7 can be a stationary computer such as a personal computer (PC) or a mobile computer such as a laptop, smart phone, etc.

In the first variant of the method, the computer program means assigns a corresponding angle signal 52, 52', 52" to each transmitted intensity pattern 61, 61', 61". For this purpose, the computer program means compares the barcode of an intensity pattern 61, 61', 61" to that of the objects 41, 41', 41" according to the angle signals 52, 52', 52". If the barcode of an intensity pattern 61, 61', 61" corresponds to that of an object 41, 41', 41", the angle of incidence 32, 32', 32" of the object 41, 41', 41" according to angle signal 52, 52', 52" is assigned to the intensity pattern 61, 61', 61".

In the second variant of the method, the computer program means reads out the information content of the two-dimensional barcode, this information content specifying the angle of incidence 32, 32', 32". This read-out angle of incidence 32, 32', 32" is assigned to the intensity pattern 61, 61', 61".

To carry out the method, a multiplex hologram 3 is arranged on a first element 1 and the light detector 6 is arranged on a second element 2. The elements 1, 2, which are designed arbitrarily per se, are spatially separated from one another, they can be separated from one another by less than 1 m or by several hundred meters. Practically, the multiplex hologram 3 is attached externally to the first element 1 or internally in the first element 1, such that the hologram plane 30 of the planar storage material is aligned in a known fixed spatial relationship to a first element plane 10 of the first element 1. In a corresponding manner, the light detector 6 is attached externally to the second element 2, such that a detector plane of the light detector 6 is aligned in a known fixed spatial relationship to a second element plane 20 of the second element 2. The light detector 6 itself can also form the second element 2. A multiplex hologram 3 arranged on a first element 1 can be acquired by multiple light detectors 6 arranged on second elements 2 such that for every second element 2, an angle between the first element plane 10 and the second element plane 20 is calculated. This can be performed independently of one another and offset in time or also simultaneously.

Figure 8:
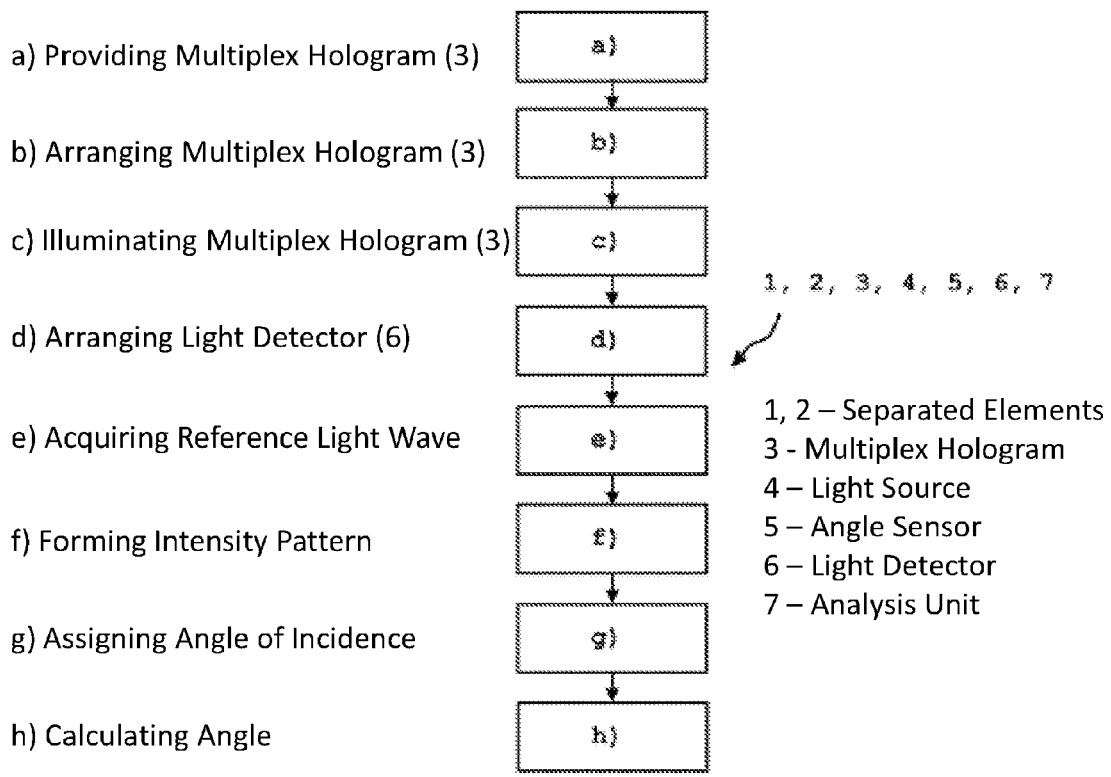
FIG. 8 shows a flow chart of the steps of the method.
Figure 9:
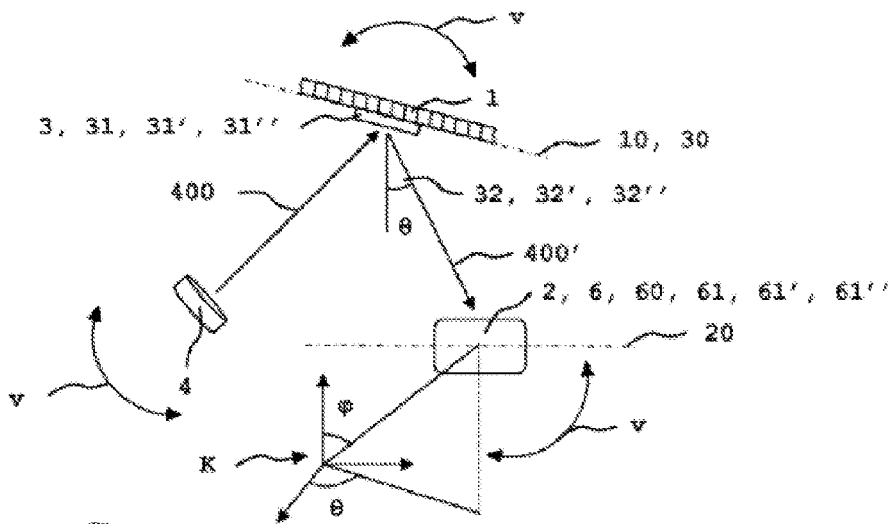
FIG. 9 shows a part of a first embodiment of a system for carrying out the method according to FIG. 8 using a multiplex hologram according to FIGS. 1 and 2.

FIG. 8 shows a flow chart of the method for measuring an angle between two spatially separated elements 1, 2, having the following steps: a) providing a multiplex hologram 3 having multiple interference patterns 31, 31', 31" arranged in a hologram plane 30, at least two interference patterns 31, 31', 31" have different angles of incidence 32, 32', 32" of an object light wave 401 on the hologram plane 30, the angles of incidence 32, 32', 32" of the interference patterns 31, 31', 31" are stored as data in a computer-readable manner; b) arranging the multiplex hologram 3 in a first element plane 10 on a first element 1; c) illuminating the multiplex hologram 3 using a reference light wave 400; d) arranging a light detector 6 in a second element plane 20 on a second element 2; e) acquiring a reference light wave 400', which is diffracted on an interference pattern 31, 31', 31", using the light detector 6; f) forming an intensity pattern 61, 61', 61" from the acquired diffracted reference light wave 400'; g) assigning the computer-readable angle of incidence 32, 32', 32", which is stored as data, to the intensity pattern 61, 61', 61"; and h) calculating an angle between the first element plane 10 and the second element plane 20 from the assigned angle of incidence 32, 32', 32".

FIGS. 9 to 12 show four exemplary embodiments of a system for carrying out the method. The system comprises the multiplex hologram 3, the light source 4, the light detector 6, and the analysis unit 7. The multiplex hologram 3 is arranged on the first element 1, and the hologram plane 30 is congruent to the first element plane 10. The light detector 6 is arranged on the second element 2, and the detector plane is congruent to the second element plane 20. Coordinates of the second element plane 20 are specified in a reference coordinate system K such as a polar coordinate system, a spherical coordinate system, or an orthogonal coordinate system. An azimuth angle coordinate $\theta$ and/or a polar angle coordinate $\phi$ of the angle between the elements 1, 2 is measured. The reference coordinate system K can be a relative or absolute coordinate system. An angle of incidence 32, 32', 32" is assigned to the intensity pattern 61, 61', 61". The coordinates of the assigned angle of incidence 32, 32', 32" are also specified in the reference coordinate system K. In step h), the angle between the first element plane 10 and the second element plane 20 is calculated from the difference of the coordinates of the second element plane 20 and the coordinates of the assigned angle of incidence 32, 32', 32". The azimuth angle coordinate $\theta$ and the polar angle coordinate $\phi$ of the angle can be measured simultaneously.

If the present invention is known, a person skilled in the art can arrange the multiplex hologram 3 at an arbitrary known arrangement angle on the first element 1; the congruency of the hologram plane 30 to the first element plane 10 is therefore not required. In the same manner, a person skilled in the art can arrange the light detector 6 at an arbitrary, known arrangement angle on the second element 2; the congruency of the detector plane to the second element plane 20 is also not required.

FIGS. 9 to 12 show a multiplex hologram 3 in the embodiment of a reflection hologram, which reflects the diffracted reference light wave 400'. The multiplex hologram 3, the light source 4, and the light detector 6 form components of a system. According to FIG. 9, in principle all of these components of the system are placeable and alignable in a spatially variable manner to the reference coordinate system, which is shown by a curved arrow identified with v (=variable). The term placeable is understood as an arbitrary spatial placement of the component of the system in the reference coordinate system. The term alignable is understood as an arbitrary alignment of the component of the system in the reference coordinate system. Concretely, however, one of these components of the system is always arranged variably and two of these components of the system are arranged to be stationary and with fixed alignment relative to one another. This is the fundamental embodiment of the invention. This spatially variable alignment and placement is delimited by the angle circumference of the multiplex hologram 3.

Figure 10:
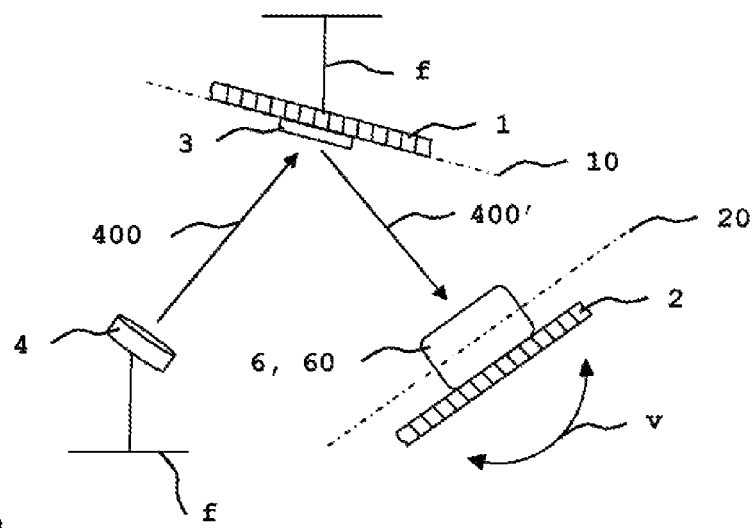
FIG. 10 shows a part of a second embodiment of a system for carrying out the method according to FIG. 8 using a multiplex hologram according to FIGS. 1 and 2.

According to FIG. 10, the light source 4 and the multiplex hologram 3 are arranged to be stationary, which is shown by a T-support identified with f (=fixed). The light detector 6 is placeable and alignable in a spatially variable manner, as shown by the arrow v. The light source 4 illuminates the multiplex hologram 3 at a constant reference light angle.

Figure 11:
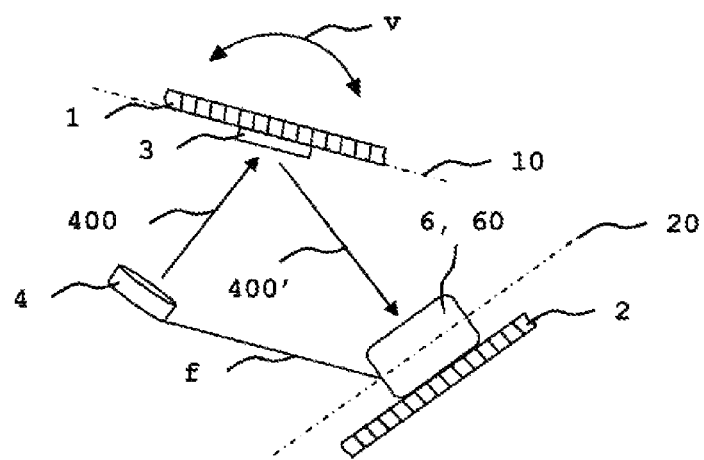
FIG. 11 shows a part of a third embodiment of a system for carrying out the method according to FIG. 8 using a multiplex hologram according to FIGS. 1 and 2.

According to FIG. 11, the light source 4 and the laser detector 6 are mechanically connected to one another and arranged to be stationary, which is shown by a line identified with f. Only the multiplex hologram 3 is placeable and alignable in a spatially variable manner, as shown by the arrow v. The light source 4 illuminates the multiplex hologram 3 at a constant reference light angle, the light detector 6 acquires the diffracted reference light wave 400' at a variable light detector angle, since the multiplex hologram 3 is placeable and alignable in a spatially variable manner.

Figure 12:
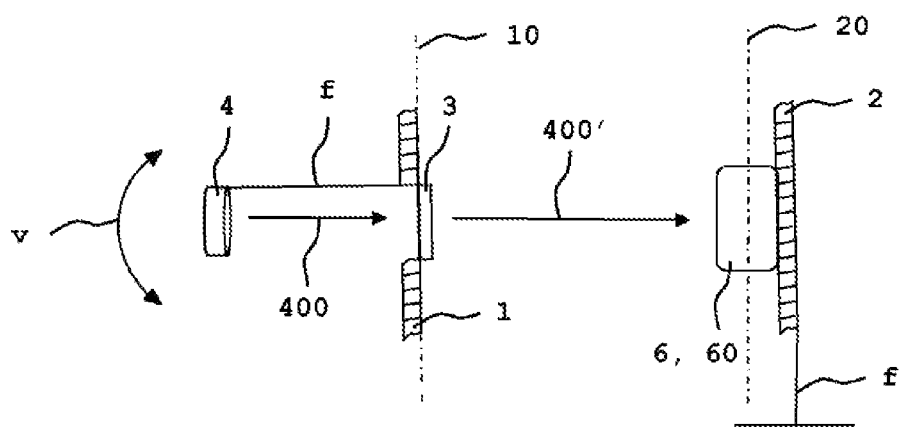
FIG. 12 shows a part of a fourth embodiment of a system for carrying out the method according to FIG. 8 using a multiplex hologram according to FIGS. 1 and 2.

FIG. 12 shows a multiplex hologram 3 in the embodiment of a transmission hologram, which transmits the diffracted reference light wave 400'. According to FIG. 12, the light detector 6 is arranged in a stationary manner, which is shown by a T-support identified with f. The light source 4 is mechanically connected to the multiplex hologram 3, which is shown by a line identified with f. Therefore, light source 4 and multiplex hologram 3 are jointly placeable and alignable in a spatially variable manner, as shown by the arrow v. The light source 4 illuminates the multiplex hologram 3 at a constant reference light angle.

Figure 13:
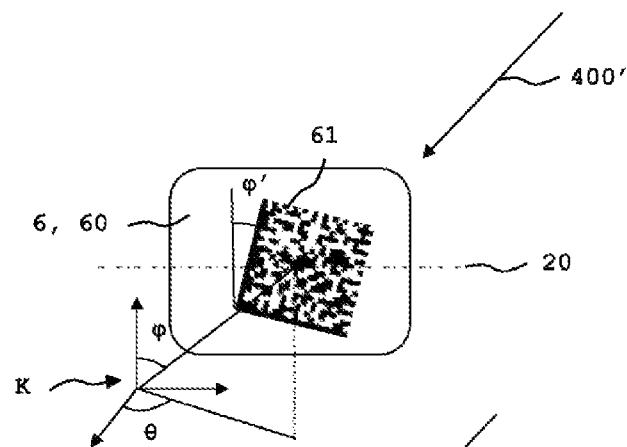
FIG. 13 shows a part of a first embodiment of a light detector for carrying out the method according to FIG. 8, using an intensity pattern which has a roll angle.

According to FIG. 13, in step e), a diffracted reference light wave 400' in the reference coordinate system K is acquired by the light detector 6 as a function of the azimuth angle coordinate θ and an intensity pattern 61 is acquired in the embodiment of a barcode. A deviation of the spatial alignment of the two-dimensional barcode from the reference coordinate system K is measured as a roll angle φ' of the light detector 6. The roll angle is a tilt of the detector plane of the light detector 6 with respect to the second element plane 20. The roll angle φ' is a further degree of freedom during the measurement of the angle between the two elements 1, 2.

Upon the comparison of the intensity pattern 61, 61', 61' to the object 41, 41', 41", a distortion of the intensity pattern 61, 61', 61' can be established, for example, if an intensity pattern 61, 61', 61' in the embodiment of a MaxiCode according to FIG. 5 has an elliptically distorted search pattern, while the corresponding MaxiCode of the object 41, 41', 41" has a circular search pattern. An angle between the first element 1 and the second element 2 can already be measured very rapidly from the size and the direction of such a distortion, without an angle of incidence 32, 32', 32" having to be assigned to the intensity pattern 61, 61', 61". Of course, the search pattern can also be distorted in a different shape, and the distortion can thus be square, trapezoidal, etc.

FIGS. 14 to 17 show several embodiments of the acquisition of a diffracted reference light wave 400' using the light detector 6 and the formation of the intensity pattern 61, 61', 61". The light detector 6 can measure the acquired Bragg intensity I within an angle range, for example, by adding up the acquired photons per pixel of the sensor 60. The Bragg intensity I varies via the angle spacing of an intensity pattern 61, 61', 61" and has approximately the shape of a bell curve, in the center of the angle range, the acquired Bragg intensity I of the diffracted reference light wave 400' is maximal. The height and width of the bell curve of the Bragg intensity I of the intensity patterns 61, 61', 61" formed from the acquired diffracted reference light wave 400' can be determined and therefore known beforehand and stored as data in a computer-readable manner. The variation of the acquired Bragg intensity I with the acquisition angle can be used for a more precise determination of the angle resolution of the intensity pattern 61, 61', 61". If the variation of the Bragg intensity I is known as a function of the acquisition angle, an angle of the intensity pattern 61, 61', 61" formed from the acquired diffracted reference light wave 400' is determined with a higher angle resolution than an angle spacing of the intensity patterns 61, 61', 61".

The angle of incidence 32, 32', 32" can be assigned, as a function of the height and width of the bell curve of the Bragg intensity I, at a fine angle resolution to the intensity pattern 61, 61', 61". This fine angle resolution of the system can thus be increased by approximately a factor of 10. The intensity pattern 61, 61', 61" is stored as data in a computer-readable manner.

Figure 14:
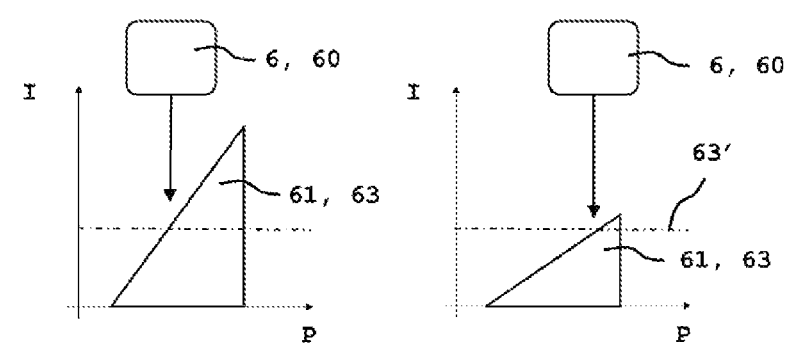
FIG. 14 shows a part of a second embodiment of a light detector for carrying out the method according to FIG. 8, having grayscale wedge in the intensity pattern.

According to FIG. 14, the intensity pattern 61 has a gray wedge 63, which is acquired with different Bragg intensity I depending on the azimuth angle coordinate θ. The light detector 6 measures the acquired Bragg intensity I of the gray wedge 63 at various positions P in the intensity pattern 61 and compares the measured Bragg intensity I of the gray wedge 63 to a predefined threshold value 63'. The position in the intensity pattern, at which the gray wedge 63 exceeds the threshold value 63', is proportional to the Bragg intensity I and therefore provides an item of information about the deviation of the angle from the angle having maximum Bragg intensity I.

Figure 15:
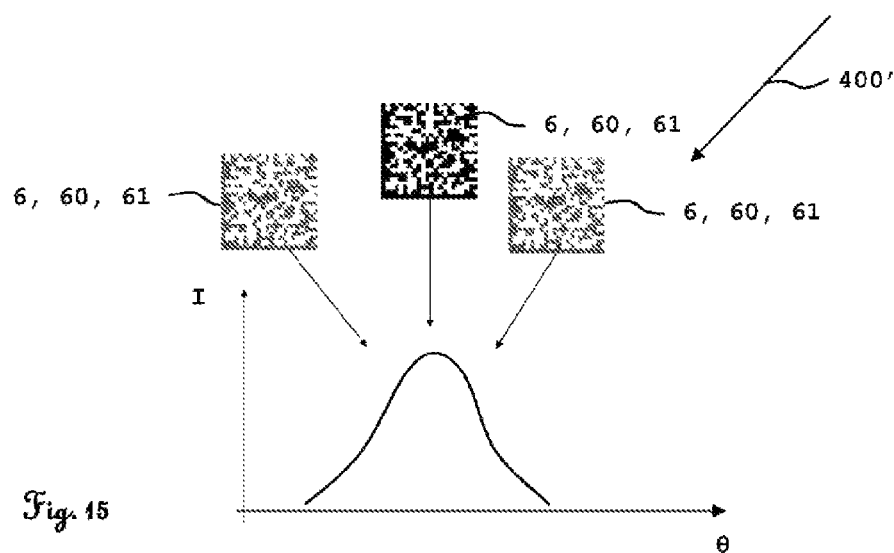
FIG. 15 shows a part of a third embodiment of a light detector for carrying out the method according to FIG. 8, having an intensity pattern which is acquired at different angles and therefore having different Bragg intensities.
Figure 16:
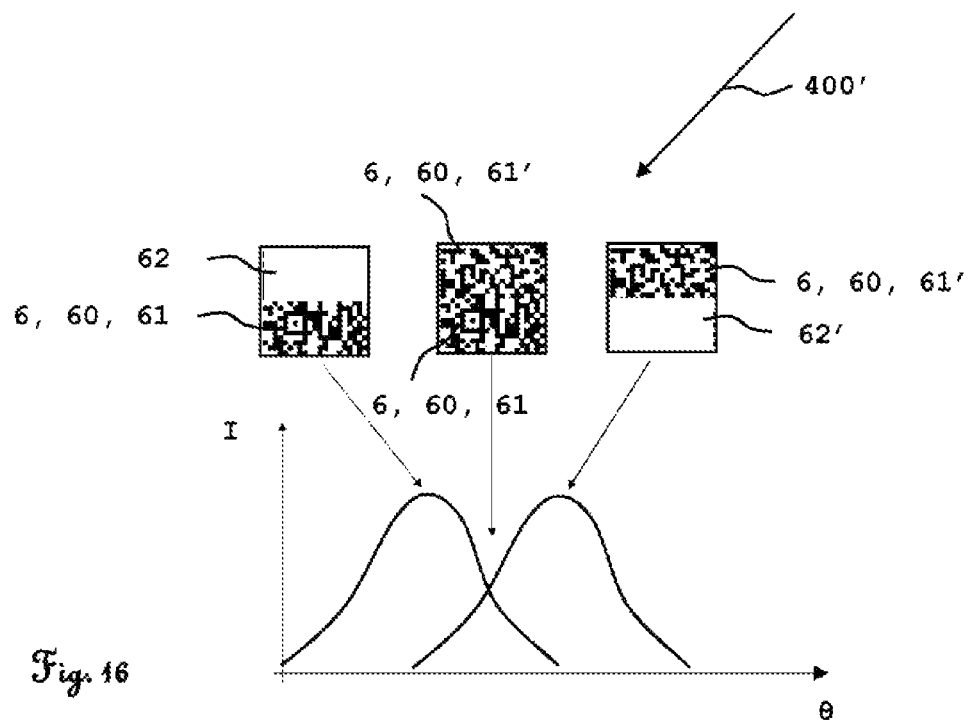
FIG. 16 shows a part of a fourth embodiment of a light detector for carrying out the method according to FIG. 8, having two intensity patterns which are acquired having maximum Bragg intensities.
Figure 17:
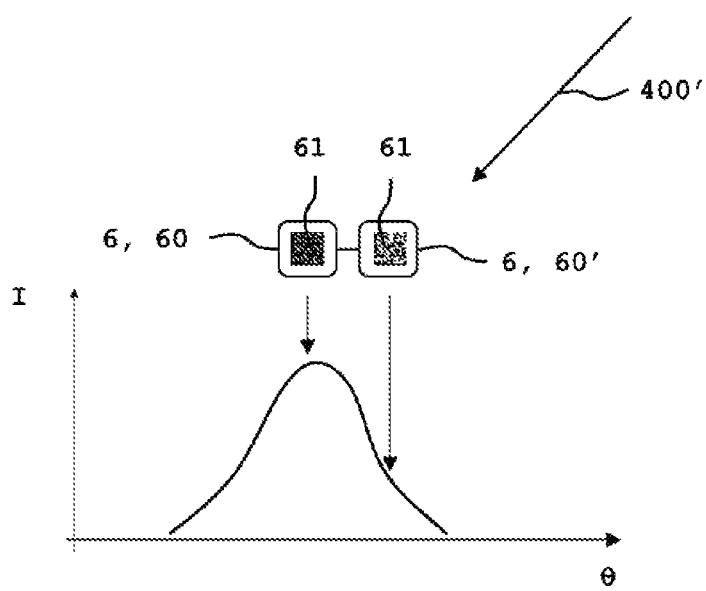
FIG. 17 shows a part of a fifth embodiment of a light detector having two sensors for carrying out the method according to FIG. 8.

According to FIGS. 15 to 17, a diffracted reference light wave 400' is acquired in the reference coordinate system K as a function of the azimuth angle coordinate θ. The acquired Bragg intensity I of the diffracted reference light wave 400' is variable over a small angle range, it is maximal in the center of the angle range, which is shown in FIGS. 15 to 17 by an intensity curve.

According to FIG. 15, an intensity pattern 61 in the embodiment of a barcode from the acquired diffracted reference light wave 400' is most intensive in the center of the angle range, which is shown by a dark barcode in the center of the angle range, two barcodes outside the center are shown as comparatively lighter.

According to FIG. 16, the multiplex hologram 3 has an arrangement of interference patterns 31, 31', 31" according to FIG. 1. For different azimuth angle coordinates θ, various intensity patterns 61, 61' are acquired. At maximum Bragg intensity I, only one single intensity pattern 61, 61' is imaged. In the transition between two intensity patterns 61, 61' of adjoining azimuth angle coordinates θ, the Bragg intensity I of the diffracted reference light wave 400' is less and two intensity patterns 61, 61' are imaged.

According to FIG. 17, a light detector 6 having two sensors 60, 60' acquires the diffracted reference light wave 400'. The two sensors 60, 60' of the light detector 6 are substantially identical in construction and are in a known fixed spatial inter-sensor spacing to one another. For example, the two sensors 60, 60' are arranged at the inter-sensor spacing of one-third of the angle range of the Bragg-intensive angle resolution of the multiplex hologram 3 to one another.

The intensity pattern 61 from diffracted reference light wave 400', in the embodiment of a barcode, is most intensive in the center of the angle range and is shown as comparatively lighter outside the center. The difference in the ascertained brightness can be used to ascertain the angle at higher precision.

It is also conceivable that the spacing is greater than the angle range of the Bragg angle resolution. In this case, both detectors receive different intensity patterns, which correspond to different angles with respect to the multiplex hologram 3. According to the triangulation known from geodesy, a distance between the first element 1 and the second element 2 may be calculated in a simple manner from the angle of incidence 32, 32', 32" and the inter-sensor spacing.

The system may be combined with an existing device for electronic distance measurement (EDM), in the case of which a distance between the first element 1 and the second element 2 is measured by means of runtime measurement or phase shift of electromagnetic or acoustic waves. The precision of the EDM is in the millimeter range at geodetic distances.

However, the system may also be combined with further existing devices. For example, at least one multiplex hologram 3 is attached to a mobile scanning device. The first element 1 is embodied as a mobile scanning device.

In a first embodiment, a handheld scanning device has a scanning tip for the superficial contact of an object to be scanned. The scanning tip is placed on multiple surfaces of the object and the spatial alignment of the scanning tip changes depending on the shape of the surfaces of the object. Scanning tip and multiplex hologram 3 are in a rigid relationship to one another.

In a second embodiment, the scanning device has a handheld laser scanner for the contactless scanning of an object. Laser light generated by the laser scanner is reflected from surfaces of the object and acquired by a CCD sensor of the laser scanner. The calculation of the distance between the surfaces of the object and the scanning device is performed by means of triangulation. During the scanning, the laser scanner can change its spatial alignment. Laser scanner and multiplex hologram 3 are in a rigid relationship to one another.

In a further embodiment, the scanning device has a fastening means for fastening on an object. The spatial alignment of the fastening means changes depending on the spatial alignment of the object. Fastening means and multiplex hologram 3 are in a rigid relationship to one another.

The changing spatial alignment of the multiplex hologram 3 of the mobile scanning device is acquired by the second element 2, in that the multiplex hologram 3 is illuminated using reference light wave 400' and the light detector 6 acquires the reference light wave 400' diffracted on the interference pattern 31, 31', 31" and images an intensity pattern 61, 61', 61". By assigning an angle of incidence 32, 32', 32" to the intensity pattern 61, 61', 61", the angle between the first element plane 10 and the second element plane 20 may be calculated.

The multiplex hologram 3 of the scanning device can be planar or curved. Multiple multiplex holograms 3, four, six, eight, ten, or even more multiplex holograms 3, can be attached to the scanning device to allow illumination of a multiplex hologram 3 and acquisition of diffracted reference light wave 400' from as many different spatial alignments of the scanning device as possible. If the present invention is known, the multiplex hologram 3 can of course also be attached to other mobile three-dimensional measuring instruments, such as a Cognitens™ OptiGo, Cognitens™ OptiCell, Cognitens™ WLS400, etc.

For example, at least one multiplex hologram 3 is attached to a construction machine such as an excavator, a loader, a Caterpillar, a grader, etc. The first element 1 is embodied as the construction machine. If the present invention is known, a person skilled in the art can also attach the multiplex hologram 3 to a component of a construction machine, such as a joint, a tool, etc.

For example, at least one multiplex hologram 3 is attached so it is stationary to a static object such as a wall, a mast, surveying rod, etc. The first element 1 is embodied as the static object. A location determination of the second element 2 is performed by means of resection using multiple multiplex holograms 3 attached to static objects in a manner coordinated in space. The second element 2 is a mobile measuring device such as a scanner, tracker, rotation laser, total station, etc. The multiplex hologram 3 of the static object can also be planar or curved; it can thus partially or completely comprise the circumference of an external lateral surface of a surveying rod. The multiplex hologram 3 of the static object can be used outside and in enclosed spaces both for earthbound surveying and also in the case of airborne surveying. The multiplex hologram 3 can be targeted directly or indirectly via prisms to survey a concealed target point.

For example, a system is used having at least one multiplex hologram 3, a light source 4, a light detector 6, and an analysis unit 7 as an angle encoder. The multiplex hologram 3 is attached to a first element 1 in the embodiment of a dynamic object such as a joint, articulated arm, robot arm, etc. The multiplex hologram 3 can be planar or curved.

For example, at least one multiplex hologram 3 is attached to a coordinate measuring machine. The first element 1 is embodied as the coordinate measuring machine. At least one camera such as a single camera or a stereo camera monitors the multiplex hologram 3. The camera corresponds to the second element 2. The changing spatial alignment of the multiplex hologram 3 of the scanning device is acquired by the second element 2, in that the multiplex hologram 3 is illuminated using reference light wave 400' and the light detector 6 acquires the reference light wave 400' diffracted on the interference pattern 31, 31', 31" and forms an intensity pattern 61, 61', 61". An angle of incidence 32, 32', 32" is assigned to the intensity pattern 61, 61', 61". The coordinate measuring machine may be monitored in the short term or long term. In the case of short-term monitoring, deformations are ascertained in the operation of the coordinate measuring machine via changing angles of incidence 32, 32', 32", the deformations caused by the startup dynamics may thus be ascertained and eliminated in real time. In the case of long-term monitoring, material fatigue is ascertained in the operation of the coordinate machine via changing angles of incidence 32, 32', 32".

For example, at least one multiplex hologram 3 is attached to a reference object of a coordinate measuring machine. The calibration object can be a reference element, a measuring table, etc. The first element 1 is embodied as a calibration object. To calibrate the coordinate measuring machine, the spatial alignment of the multiplex hologram 3 is acquired from the second element 2, in that the multiplex hologram 3 is illuminated using the reference light wave 400' and the light detector 6 acquires the reference light wave 400' diffracted on the interference pattern 31, 31', 31" and forms an intensity pattern 61, 61', 61". At least one angle of incidence 32, 32', 32" is assigned to the intensity pattern 61, 61', 61". The second element 2 is moved in such a way into a calibration position until the assigned angle of incidence 32, 32', 32" corresponds to a predefined calibration angle.

It is obvious that these illustrated figures only schematically illustrate possible embodiments. The various approaches can also be combined with one another and with methods and devices of the prior art.

What is claimed is:

1. A method for measuring an angle between two spatially separated elements, the method comprising:
   providing a multiplex hologram having multiple interference patterns, at least two interference patterns have different angles of incidence of an object light wave on a hologram plane, the angles of incidence are stored as data in a computer-readable manner;
   arranging the multiplex hologram in a first element plane on a first element;
   illuminating the multiplex hologram using a reference light wave;
   arranging a light detector in a second element plane on a second element;
   acquiring a reference light wave, which is diffracted on an interference pattern, using the light detector;
   forming an intensity pattern from the acquired diffracted reference light wave;
   assigning the computer-readable angle of incidence, which is stored as data, to the intensity pattern; and
   calculating an angle between the first element plane and the second element plane from the assigned angle of incidence.

2. The method as claimed in claim 1, wherein the different angles of incidence are subject to a discrete, non-continuous distribution to one another and a discrete number of independent interference patterns, which may be read out individually, are superimposed in a unit of the multiplex hologram.

3. The method as claimed in claim 1, wherein an intensity pattern is a flatly extending arrangement of a plurality of shapes, which can be unambiguously differentiated from the remaining surface, wherein an intensity pattern has a machine-readable information content.

4. The method as claimed in claim 3, wherein the machine readable information content comprises code.

5. The method as claimed in claim 1, wherein coordinates of the second element plane are specified in a reference coordinate system; coordinates of the assigned angle of incidence are specified in the reference coordinate system;
   and the angle is calculated from the difference of the coordinates of the second element plane and the coordinates of the assigned angle of incidence.

6. The method as claimed in claim 1, wherein a reference coordinate system having an azimuth angle coordinate ($\theta$) and a polar angle coordinate ($\phi$) is used;
   and, in step h), the azimuth angle coordinate ($\theta$) and the polar angle coordinate ($\phi$) of the angle are measured simultaneously.

7. The method as claimed in claim 1, wherein an angle signal is stored as data in a computer-readable manner, which has the angle of incidence and which has an object; and wherein the intensity pattern is compared to the computer-readable data-stored objects; and
   in the event of correspondence of the intensity pattern to an object, the angle of incidence of this object is assigned to the intensity pattern.

8. The method as claimed in claim 1, wherein at least one items of auxiliary information is transmitted from the light source to the light detector the items of auxiliary information is selected from the list consisting of:
   a type of the multiplex hologram,
   a version of the interference patterns, and
   an angle signal.

9. The method as claimed in claim 1, wherein a two-dimensional barcode is used as the intensity pattern.

10. The method as claimed in claim 9, wherein an information content of the two-dimensional barcode is read out, this information content specifying the angle of incidence, and this read-out angle of incidence is assigned to the intensity pattern.

11. The method as claimed in claim 9, wherein the acquired diffracted reference light wave is acquired in a reference coordinate system; and a deviation of a spatial alignment of the two-dimensional barcode to the reference coordinate system is measured as a roll angle ($\phi'$) of the light detector.

12. The method as claimed in claim 1, wherein the multiplex hologram is illuminated at a constant reference light angle using the reference light wave and/or the multiplex hologram is illuminated at a constant reference light angle by a stationary reference light source using the reference light wave.

13. The method as claimed in claim 1, wherein the diffracted reference light wave is acquired at a constant light detector angle by a stationary light detector.

14. The method as claimed in claim 1, wherein a Bragg intensity of the acquired diffracted reference light wave is acquired;
   and, if a variation of the Bragg intensity as a function of the acquisition angle is known, an angle of the intensity pattern, which is formed from the acquired diffracted reference light wave, is determined at a higher angle resolution than an angle spacing of the intensity pattern.

15. The method as claimed in claim 1, wherein a multiplex hologram, which is arranged in the first element plane on the first element, is acquired by multiple light detectors, which are arranged in second element planes on second elements.

16. The method as claimed in claim 15, wherein an angle between the first element plane and the second element plane is measured from the assigned angle of incidence for each second element.

17. A multiplex hologram comprising:
   multiple interference patterns, at least two interference patterns have different angles of incidence of an object light wave on a hologram plane, the angles of incidence are stored as data in a computer-readable manner, wherein the multiplex hologram is arranged in a first element plane on a first element, wherein the multiplex hologram is illuminated using a reference light wave;
   a light detector arranged in a second element plane on a second element, wherein the light detector is configured to acquire a reference light wave, which is diffracted on an interference pattern, using the light detector, and wherein an intensity pattern is formed from the acquired diffracted reference light wave;
   a computer-readable medium storing an angle of incidence assigned with the intensity pattern; and
   a controller that calculates an angle between the first element plane and the second element plane from the assigned angle of incidence.

18. The multiplex hologram according to claim 17, wherein the first element is embodied in a device selected from the list consisting of:
   a mobile scanning device,
   a construction machine,
   a static object,
   a dynamic object,
   a coordinate measuring machine, and
   a calibration object of a coordinate measuring machine.

19. The multiplex hologram according to claim 17, wherein
- i) the system has a multiplex hologram having multiple interference patterns;
- ii) at least two interference patterns of the multiplex hologram have different angles of incidence of an object light wave on a hologram plane; said angles of incidence being stored as data in a computer-readable manner;
- iii) the multiplex hologram is arranged in a first element plane on a first element;
- iv) the system has a light source, which illuminates the multiplex hologram using a reference light wave;
- v) the system has a light detector, which is arranged in a second element plane on a second element; which acquires a reference light wave diffracted on an interference pattern; and which forms an intensity pattern from the acquired diffracted reference light wave; and/or
- vi) the system has an analysis unit, which assigns the computer-readable angle of incidence, which is stored as data, to the intensity pattern; and which calculates an angle between the first element plane and the second element plane from the assigned angle of incidence.

20. A computer program product comprising a non-transitory computer-readable medium embodying code executable by a computing system, the code comprising:
- providing a multiplex hologram having multiple interference patterns, at least two interference patterns have different angles of incidence of an object light wave on a hologram plane, the angles of incidence are stored as data in a computer-readable manner;
- arranging the multiplex hologram in a first element plane on a first element;
- illuminating the multiplex hologram using a reference light wave;
- arranging a light detector in a second element plane on a second element;
- acquiring a reference light wave, which is diffracted on an interference pattern, using the light detector;
- forming an intensity pattern from the acquired diffracted reference light wave;
- assigning the computer-readable angle of incidence, which is stored as data, to the intensity pattern; and
- calculating an angle between the first element plane and the second element plane from the assigned angle of incidence.

* * * * *